United States Patent [19]
Hoque

[11] Patent Number: 5,410,736
[45] Date of Patent: Apr. 25, 1995

[54] METHOD FOR DETERMINING RADIO TRANSMITTER SITES WITH SIGNALS THAT MAY POTENTIALLY INTERFERE WITH AN INTENDED SIGNAL AT A RADIO RECEIVER SITE

[75] Inventor: Mahbub U. Hoque, Mt. Olive Township, Morris County, N.J.

[73] Assignee: Bell Communications Research, Inc., Livingston, N.J.

[21] Appl. No.: 71,919

[22] Filed: Jun. 3, 1993

[51] Int. Cl.$^6$ .................. H04B 7/26; H04B 17/00; H04Q 7/02
[52] U.S. Cl. .................. 455/52.1; 455/33.1; 455/56.1; 455/67.4
[58] Field of Search .............. 455/52.1, 67.1, 67.3, 455/67.4, 67.5, 67.6, 56.1, 10, 33.1; 343/703

[56] References Cited
U.S. PATENT DOCUMENTS

| | | | |
|---|---|---|---|
| 4,346,385 | 8/1982 | Schiavone et al. | 343/703 |
| 5,134,709 | 7/1992 | Bi et al. | 455/33.1 |

OTHER PUBLICATIONS

McGrane, A. R., "A Microwave Propagation Prediction Tool, MPT, and its Performance in Practice", Nov. 16, 1990, *IEE Colloquium on 'Diffraction Propagation Modelling Techniques Embracing Surface Feature Data'*, all pages.

Lebherz, M., "Features of 3D VHF/UHF Propagation Channel Modelling", Apr. 15–18, 1991, *Seventh International Conference on Antennas and Propagation ICAP 91*, pp. 976–979.

Craig, K. H., "Numercial Modelling of Propagation Effects", *IEE Colloquium on 'National Radio Propagation Programme'*, Jan. 8, 1991, pp. 5/1–5/3.

AD–687–820, "Transmission Loss Predictions for Tropospheric Communication Circuits" vol. I, Technical Note 101, P. L. Rice, A. G. Longley, K. A. Norton and A. P. Barsis. 1967.

AD–687–821, "Transmission Loss Predictions for Tropospheric Communication Circuits", vol. II, Technical Note 101, P. L. Rice, A. G. Longley, K. A. Norton and A. P. Barsis, 1967.

*Primary Examiner*—Edward F. Urban
*Assistant Examiner*—Mark D. Wisler
*Attorney, Agent, or Firm*—Leonard Charles Suchyta; Joseph Giordano

[57] ABSTRACT

A method for conducting radio transmission systems interference studies based on the prior art two-step process of conducting a simple analysis on all potentially interfering systems to eliminate those clearly not causing interference into radio receiver under study, and then conducting a detailed analysis on the remaining systems. The new method replaces the first step in the prior art system with a method using pre-calculated average terrain elevations over a geographic block for determining whether the loss should be calculated using a smooth terrain calculation method with a simulated single knife edge diffraction obstacle in the path, or a rough terrain calculation method that substitutes a pre-calculated block roughness factor in place of the path roughness factor, and then also substitutes a new effective antenna height for the actual antenna height in the propagation loss calculations.

7 Claims, 3 Drawing Sheets

METHOD FOR DETERMINING RADIO TRANSMITTER SITES WITH SIGNALS THAT MAY POTENTIALLY INTERFERE WITH AN INTENDED SIGNAL AT A RADIO RECEIVER SITE

TECHNICAL FIELD OF THE INVENTION

This invention relates to radio transceiver site placement engineering. More specifically, this invention relates to a method and system used by radio engineers to more efficiently conduct spectrum analysis and interference studies between existing and new radio transmission systems.

BACKGROUND OF THE INVENTION

Reliable and efficient performance of radio transmission systems used in telecommunications activities depend on the optimum utilization of the available radio spectrum within a geographic area. Optimum utilization is achieved by conducting spectrum analysis between existing radio systems and any new systems to be installed. Computer based systems have been developed to assist radio engineers in their spectrum analysis activities.

To conduct a spectrum analysis, first, one must calculate the signal power of a signal intended to be received at a specified location (hereinafter "C") and then, all undesired signals that can also be expected to be received at the receiver location (hereinafter "I"). The ratio (C/I) of the intended signal level to the interfering signals is then calculated and compared to minimum tolerance values, called signal to noise ratio objectives, which are established according to the specification of the radio receiver under study. If the calculated ratio is larger than the objective, then the radio system is deemed to be able to be operated efficiently (i.e. operate without interference from other systems that would hinder transmission performance of the system under study). If the calculated ratio is smaller than the objective, than the performance of the transmission system under study will be affected and some engineering choices must be made. These could include increasing the transmission power of the new system, or a new site placement for the receiver.

Calculating the received power of a radio transmission is a complicated calculation requiring the incorporation of many factors into the analysis. These factors include such items as antenna height, the terrain clearance, the free path space loss, antenna gain, multipath fading, and the attenuation due to water vapor absorption. Algorithms for computing radio propagation path loss are well known in the art. In fact, the National Telecommunication Information Agency, an agency of the U.S. Department of Commerce, has published Technical Note 101, in 1976, which provides a detailed set of methods and algorithms and technical data used by radio engineers in computing the path loss for microwave radio transmission systems. This Technical Note is comprehensive compilation of technical data and contains many complicated propagation algorithms that have been encoded into computerized radio engineering systems.

One such computerized system used by engineers in the Regional Bell Operating telephone companies is called the Microwave Radio and Satellite Engineering and Licensing System II (MRSELS-II) developed by Bell Communications Research Inc. This system conducts the spectrum analysis after specified inputs are provided by the radio engineers. The analysis is conducted in two phases. The first is a conservative automated study based on a line-of-site transmission model that identifies existing transmitters that may potentially interfere with a proposed new receiver. This conservative automated study overestimates the power of the signals from other transmitters to eliminate from consideration, as potential interfering systems, those that will not in practice, interfere.

In the second phase, as a second step, a detailed analysis is conducted on the potential interfering systems using the more accurate propagation models from Technical Note 101 that require the use of detailed terrain information. The terrain information is provided by the 3 second U.S. Geological Survey terrain database. This more detailed analysis must be repeated for each potential interfering system. Experience has shown that 80 to 90% of the systems that are identified as potential interfering systems during the first step are found to not interfere after the more detailed analysis is conducted incorporating terrain data. Consequently, significant computer and manpower resources are wasted conducting detailed studies on systems that have little likelihood of causing problems when the terrain information is included.

Therefore, it is an object of my invention to provide a method and system that will reduce the number of cases of potentially interfering systems that require a more detailed analysis without being as computationally intensive as the prior art systems.

SUMMARY OF THE INVENTION

A method for conducting spectral analysis studies on radio transmissions from potentially interfering transmitters at a receiver that replaces the first phase of the two phase prior art process with a process that incorporates the impact of terrain on the interfering signal's propagation. My method incorporates the steps of:
  dividing the geographic area for which studies will be conducted by the radio engineer into smaller blocks,
  calculating in advance for each block, a roughness factor and the average terrain elevation, to be stored in a database,
  using the coordinates for a new receiver site to retrieve from the database the roughness factor and the average terrain elevation for corresponding geographic block,
  determining whether to use the my smooth terrain or my rough terrain propagation models for calculating the path loss from the interfering transmitters whereby if the average terrain elevation is less than 30 feet then calculate the path loss and received signal power from the potentially interfering transmitter using my smooth terrain model and if the average terrain elevation for the block is greater than or equal to 30 feet then calculate the path loss and received signal power from the potentially interfering transmitter using my rough terrain model, and
  eliminate the transmitter as a potential interfering transmitter source if the received power from this potential interfering transmitter is below the allowable limit.

My smooth and rough terrain methods use known algorithms with certain modifications and substitutions for calculating propagation loss. Under my smooth terrain methods, if the transmitter and receiver are line-of-site, standard line-of-site algorithms are employed. If the transmitter and receiver are not line-of-site than a single knife edge obstacle is assumed at the center of the path with an elevation necessary to provide a common horizon for the receiver and transmitter. Under my rough terrain methods, a new effective antenna height is calculated for each antenna to be used in place of the actual antenna height in the calculations. This effective antenna height is calculated by reducing the above mean sea level actual antenna height by 50 percent of the average terrain elevation for the block. In addition, the block roughness factor is used in place of the detailed path terrain information used in the prior art propagation calculation methods.

My method more accurately calculates the path loss for transmissions from potentially interfering systems without having to incorporate the detailed terrain information along each path. Using my method therefore eliminates from consideration 80 to 90% of the potentially interfering systems before having to resort to the more resource intensive detailed analysis of the second step in the prior art process.

DETAILED DESCRIPTION

Figure 1:
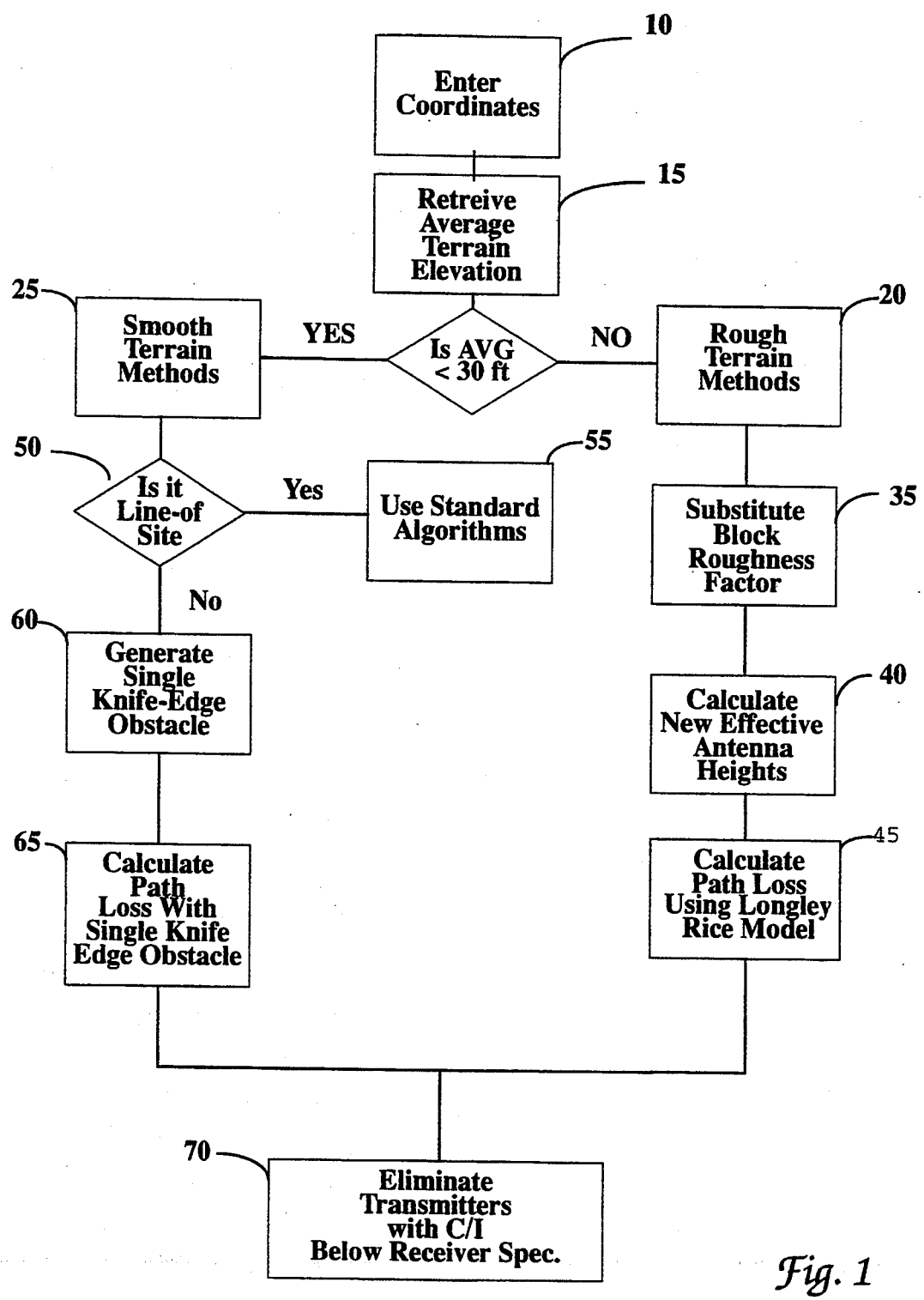
FIG. 1 depicts the new inventive process.

In the prior art MRSELS II system, a first cut at potential interfering systems is conducted using a simple to calculate line-of-site propagation model. This model eliminates from a list of potential systems those that will definitely not interfere with a proposed new receiver site. However, this simple line-of-site analysis overestimates the received power of the potential interfering systems because transmitting signal in most cases is, in actuality, blocked by certain terrain features or the earth's bulge which is ignored by the simple line-of-site analysis.

In the second phase in the prior art process, those radio systems, still considered to be potentially interfering systems, are then analyzed in more detail using propagation models and detailed terrain information which more accurately calculates the path loss. The accuracy is improved because among other factors the impact of terrain features is incorporated into the analysis. These more accurate propagation models require significantly more computer time and engineering resources than the simple line-of-site model. Consequently, it is economically unfeasible to conduct a detailed analysis on every potential interfering system.

My invention is a more efficient method to conduct the first phase of the spectrum analysis incorporating terrain effects without necessitating the detailed computations and engineering judgement that would be required in the analysis using the detailed algorithms and propagation models from NTIA Technical Note 101. Specifically, one of the most complicated and time consuming aspects of conducting a detailed analysis is computing and incorporating all the terrain features along a path under study. This terrain information must be incorporated and computed for each path from a potential interfering transmitter to a receiver under study. In some prior art models terrain information along a path is quantified in something called a roughness factor. The roughness factor is calculated by computing the variance among the 20 to 80% elevation levels along any path. (see the Longley-Rice propagation model in NTIA Technical Note 101). My inventive method and system more accurately calculates the undesired signal than the current line-of-site path loss algorithm but in no case will it predict a loss greater than that calculated using the prior art programs based on the NTIA models.

My inventive method is based on calculating, in advance, a roughness factor and an average terrain elevation factor for individual geographic blocks, illustratively 30 sq. miles, and not individually for each path. These factors are stored in a database with all other information associated with each geographic block. All elevation values are delineated in feet above mean sea level (AMSL). As an example, to determine the average terrain elevation (AVG), the values of each terrain elevation listed in the U.S. Geological Survey database for a particular block are averaged. To determine the roughness factor, the variance is calculated among the elevation values for those values that are between 20 and 80% of the distribution of terrain elevation values for that particular block.

My inventive process is depicted by the flow diagram in FIG. 1. Step 1 of the process is to enter the coordinates of a radio receiver under study into the computer system 10. Based on the coordinates, the geographic block where the receiver to be sited is determined and then from the database the previously calculated and stored average terrain elevation values and roughness factor are extracted 15. If the average terrain value is greater than or equal to some predetermined threshold, illustratively 30 ft., then the propagation loss for any interfering system is calculated according to a rough terrain method 20. If the average terrain elevation value is below some predetermined threshold, illustratively 30 ft., and if the average terrain value for the block is greater than the antenna height above mean sea level, then the propagation loss will be calculated according to a smooth terrain method 35.

Figure 2:
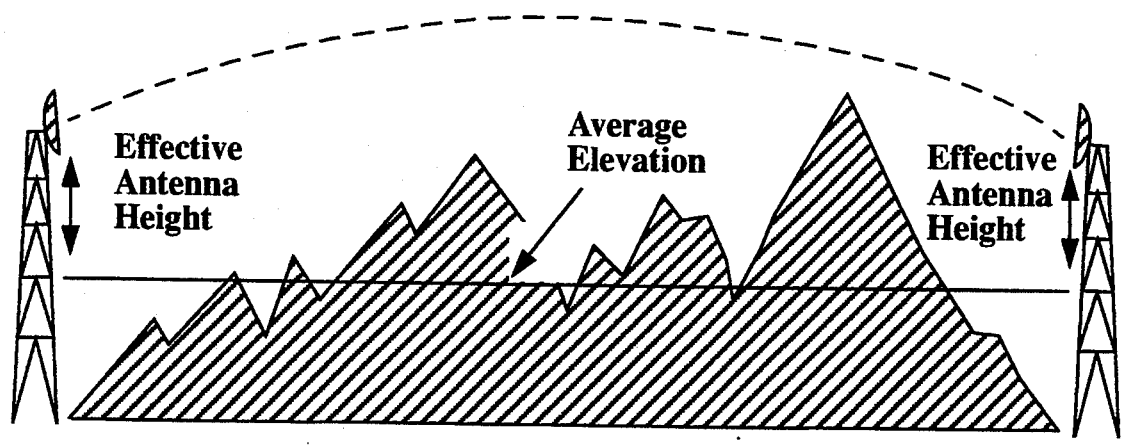
FIG. 2 illustrates the new effective antenna-height.

My rough terrain method for calculating the path loss due to electromagnetic diffraction is based on the Longley-Rice model detailed in NTIA Technical Note 101 with two modifications. The first modification is that instead of computing the roughness factor for the path between the two antenna sites, the roughness factor for the geographic block previously calculated and stored in the database is used 35. If both the transmitter antenna and the receiver antenna are located in different geographic blocks, the minimum value of the roughness factors for the two or more blocks is used. The number of blocks considered could be greater than two if the transmission path spans more than two blocks. The second modification is a modification of the antenna height parameter in the Longley-Rice model to something called the "effective antenna height" 40. The new effective antenna height for the rough method is equal to the actual AMSL antenna height reduced by a percentage, illustratively 50%, of the previously calculated average terrain elevation for the block. FIG. 2 illustrates my method for calculating a new effective antenna height. The path loss is then calculated with these new parameters 45. In summary, the method for calculating the path loss using my rough terrain model is to use the prior art Longley-Rice algorithms detailed in the NTIA Technical Note 101 substituting the block roughness factor for the path roughness factor and substituting my new effective antenna height for the actual antenna height used in the Longley-Rice model.

Figure 3:
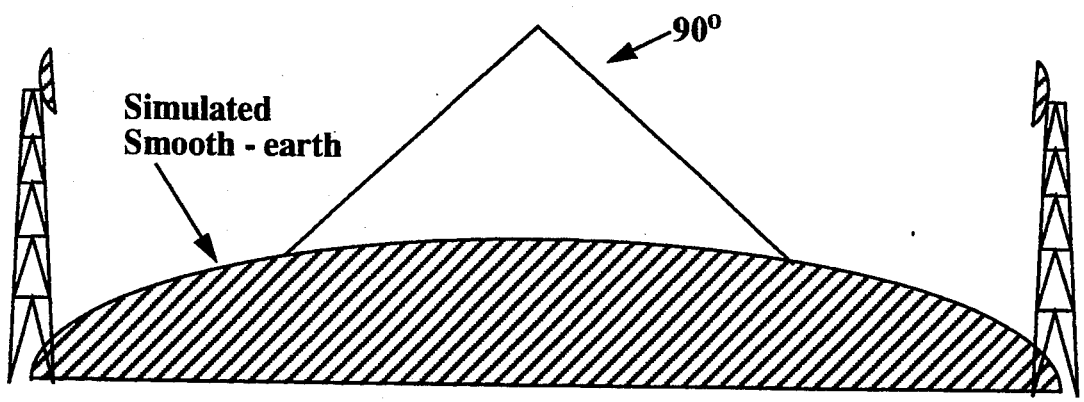
FIG. 3 illustrates the generation of a modified terrain profile for use as a single knife edge obstacle.

My smooth terrain method for calculating path losses is itself divided into two process 50; one process for antennae in line-of-site, and one process for antennae not in line-of-site. If the antennae are in line-of-site then the prior art line-of-site propagation models are used to calculate the path loss 55. However, in the prior art standard algorithms for calculating propagation loss over smooth terrain, antenna's that are not in line-of-site require an algorithm that assumes a double knife edge diffraction; one knife edge for the line-of-site horizon for each antenna. This approach overestimates the path loss. Consequently, my method for non-line-of-site smooth terrain propagation calculation requires the step of generating a hypothetical terrain feature in the center of the path 60, the peak of which would be the line-of-site horizon for each antenna. FIG. 3 illustrates a modified terrain model with a hypothetical terrain feature 90. Then NTIA methods for calculating path loss across a single knife edge diffraction point are used with the AMSL height of the computer generated terrain feature as the single knife edge and with the AMSL height of each antenna as the effective antenna heights 65.

Figure 4:
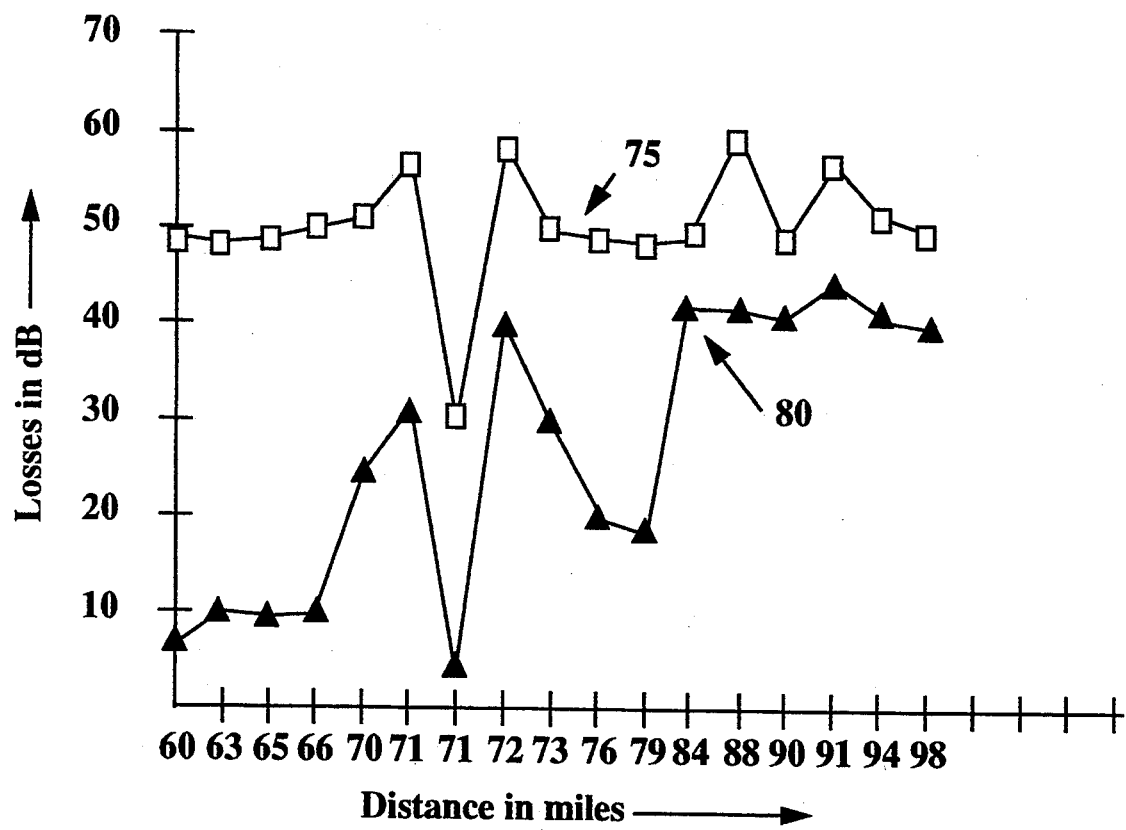
FIG. 4 depicts the results of a validation study of the new method.

Once my inventive process above has been completed those systems that are determined to be potentially interfering systems are analyzed using the prior art detailed analysis method which includes in the analysis the detailed terrain features along the path 70. The advantage of my method for efficiently estimating path losses is that two parameters, the roughness factor and the average terrain height factor, can be calculated for whole geographic blocks and store in the database saving the need to extract detailed terrain information for each system and the need to calculate these factors for each path. This saves significant computer time. In addition, because my method more accurately estimates the propagation losses from potential interfering transmitters, the first phase analysis using my method drastically reduces the number of systems that have to be analyzed using the detailed propagation algorithms. For example, if 100 systems were identified as needing a detailed analysis under the prior art method, using my method the number of systems requiring a detailed analysis would be reduced to 10 to 15. FIG. 4 depicts the results of some validation studies conducted using the detailed analysis under the prior art program 75 and the analysis under my inventive method 80. The results show that in each case my method estimated transmission losses never more than the prior art detailed analysis methods and tracked well with the specific results.

Clearly, those skilled in the art recognize that the principles that define my method are not limited to the embodiment illustrated herein. Other embodiments may be readily devised by those skilled in the art.

We claim:

1. An efficient method for determining from a large plurality radio transmitters within vicinity of a radio receiver, the radio transmitters with signals that could potentially interfere with a signal intended to be received at the radio receiver, said method consisting of the steps of:

dividing a geographic area into smaller sized geographic blocks;

determining a roughness factor for each of said blocks;

determining an average terrain elevation for each of said blocks;

storing said average terrain elevation and said roughness factor for each of said geographic blocks in a database;

identifying geographic coordinates of said radio receiver under study;

identifying geographic coordinates of one of said plurality of radio transmitters;

identifying the geographic blocks containing said coordinates for both said receiver and said one of said said transmitters and any geographic blocks located between said receiver and said one of said transmitters;

recalling from said database said average terrain elevations and said roughness factors for said identified geographic blocks;

calculating a signal power level received at said receiver from said transmitter using a smooth terrain propagation model if the average terrain elevation for said identified blocks is below a predetermined threshold;

calculating a signal power level received at said receiver from said transmitter using a rough terrain propagation model if the average terrain elevation for said identified blocks is equal to or above said predetermined threshold and using the lowest block roughness factor from said identified geographic blocks in place of the actual path terrain information in the loss calculations; and identifying a transmitter as a potentially interfering transmitter if said calculated signal power is above the allowed signal power for an interfering signal allowable for said receiver.

2. The method according to claim 1 wherein said smooth terrain propagation model comprises the step of simulating a single knife edge obstacle in the center of the transmission path between said transmitter and said receiver to provide said transmitter and said receiver with a common horizon.

3. A method for determining from a large plurality radio transmitters within vicinity of a radio receiver, the radio transmitters with signals that could potentially interfere with a signal intended to be received at the radio receiver, said method consisting of the steps of:

dividing a geographic area into smaller sized geographic blocks;

determining a roughness factor for each of said blocks;

determining an average terrain elevation for each of said blocks;

storing said average terrain elevation and said roughness factor for each of said geographic blocks in a database;

identifying geographic coordinates of said radio receiver under study;

identifying geographic coordinates of one of said plurality of radio transmitters;

identifying the geographic blocks containing said coordinates for both said receiver and said one of said transmitters and any geographic blocks located between said receiver and said one of said transmitters;

recalling from said database said average terrain elevations and said roughness factors for said identified geographic blocks;

calculating a signal power level received at said receiver from said transmitter using a smooth terrain propagation model if the average terrain elevation for said identified blocks is below a predetermined threshold;

calculating a signal power level received at said receiver from said transmitter using a rough terrain propagation model if the average terrain elevation for said identified blocks is equal to or above said predetermined threshold and using the lowest block roughness factor from said identified geographic blocks in place of the actual path terrain information in the loss calculations and wherein said rough terrain propagation model substitutes an effective antenna height for the actual antenna height above mean sea level of both the transmitter and receiver whereby said effective antenna height for each is determined by reducing the average terrain elevation factor for the geographic block containing the antenna by a predetermined percentage factor, and subtracting said reduced average terrain elevation from the actual receiver and transmitter antenna heights; and identifying a transmitter as a potentially interfering transmitter if said calculated signal power is above the allowed signal power for an interfering signal allowable for said receiver.

4. The method of claim 3 wherein said predetermined percentage factor for reducing said average terrain elevation equals 50%.

5. The method of claim 1 wherein said predetermined threshold is 30 feet.

6. The method for efficiently conducting spectrum analysis studies on a plurality of radio transmitters to determine which radio transmitters could potentially interfere with the intended signal received at a receiver, said method comprising:

a screening step for eliminating from consideration those transmitters that can be determined to not interfere with the receiver without a detailed individual analysis of the transmission paths between each potentially interfering transmitter and said receiver, said screening step comprises;

using a smooth terrain propagation model for calculating the signal power level of a radio transmission from a transmitter received at said receiver when the average terrain elevation in the geographic region around said receiver is below a threshold, wherein a simulated single knife edge obstacle is placed at the center of the path between one of said plurality of radio transmitters and said receiver whenever said transmitter and said receiver are not in line of site;

using a rough terrain propagation model for calculating the signal power level of a radio transmission from a transmitter received at said receiver when the average terrain elevation in the geographic region around said receiver is equal to or above a threshold, wherein an effective antenna height is calculated based on the average terrain elevation to replace the actual antenna heights in the calculation, and wherein a predetermined roughness factor for the area is used in place of the detailed terrain information for the path between said transmitter and said receiver; and eliminating from consideration as a potentially interfering transmitter said radio transmitter when said calculated signal power is below an allowable level for said receiver specifications; and conducting a detailed analysis on the radio transmissions from the transmitters not eliminated by said screening step using the traditional methods for calculating the path loss of a radio transmission incorporating detailed terrain information.

7. The method as recited in claim 6 wherein said average terrain elevation threshold is 30 ft.

* * * * *